(12) United States Patent
Oskarsson et al.

(10) Patent No.: US 7,731,373 B2
(45) Date of Patent: Jun. 8, 2010

(54) WINDOW WITH RESISTANCE HEATING ELEMENT

(75) Inventors: Maria Oskarsson, Olofstorp (SE); Jenny Hendenberg, Göteborg (SE); Jan Rapo, Göteborg (SE); Martin Petersson, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/331,012

(22) Filed: Dec. 9, 2008

(65) Prior Publication Data

US 2009/0147360 A1 Jun. 11, 2009

(30) Foreign Application Priority Data

Dec. 11, 2007 (EP) .................... 07122842

(51) Int. Cl.
*G02B 7/18* (2006.01)
*B60L 1/02* (2006.01)

(52) U.S. Cl. ..................... 359/512; 219/203

(58) Field of Classification Search ............... 359/507, 359/512; 219/203, 219
See application file for complete search history.

(56) References Cited

U.S. PATENT DOCUMENTS

| | | | | |
|---|---|---|---|---|
| 2,773,162 A * | 12/1956 | Christensen | ................. | 219/770 |
| 3,553,833 A * | 1/1971 | Jochim et al | ................. | 29/611 |
| 3,749,885 A * | 7/1973 | Nagasima | ................. | 219/522 |
| 3,888,711 A * | 6/1975 | Breitner | ................. | 156/93 |
| 4,127,763 A * | 11/1978 | Roselli | ................. | 219/203 |
| 4,395,622 A * | 7/1983 | Dran et al. | ................. | 219/522 |
| 5,638,209 A * | 6/1997 | Okada et al. | ................. | 359/507 |
| 5,804,817 A | 9/1998 | Seiler et al. | | |
| 5,886,321 A * | 3/1999 | Pinchok et al. | ............ | 219/203 |
| 6,316,746 B1 * | 11/2001 | Golston | ................. | 219/219 |
| 6,320,159 B1 * | 11/2001 | Topp | ................. | 219/203 |
| 6,559,419 B1 * | 5/2003 | Sol et al. | ................. | 219/203 |
| 6,914,224 B2 * | 7/2005 | Gillner et al. | ................. | 219/522 |

FOREIGN PATENT DOCUMENTS

EP 1 605 729 12/2005

OTHER PUBLICATIONS

European Search Report for the corresponding European Patent Application No. EP 07 12 2842 mailed May 27, 2008.

* cited by examiner

*Primary Examiner*—Ricky D Shafer
(74) *Attorney, Agent, or Firm*—Frank A. MacKenzie; Brooks Kushman P.C.

(57) ABSTRACT

An electrically heated window intended to be fitted with an imaging device which views an object through a viewing area of the window. A resistance heating element comprises at least one electrically conductive wire extending across the viewing area a plurality of times along a plurality of arc-shaped path.

10 Claims, 3 Drawing Sheets

WINDOW WITH RESISTANCE HEATING ELEMENT

CROSS-REFERENCE TO RELATED APPLICATION

This application claims foreign priority benefits under 35 U.S.C. §119(a)-(d) to EP 07122842.3 filed Dec. 11, 2007, which is hereby incorporated by reference in its entirety.

BACKGROUND

1. Technical Field

The present invention relates to an electrically heated window with a resistance heating element, and more specifically to a window with a resistance heating element which is arranged to be in working cooperation with an imaging device such as a camera.

2. Background

As road safety bodies, government agencies, vehicle manufacturers and other interested parties strive to increase road safety, despite increasing congestion and the proliferation of potential distractions to drivers, one approach adopted is to provide technical aids to drivers to assist them to drive safely. For example, one such aid may monitor a vehicle's course relative to the road ahead, and alert the driver when deviations occur. It is also possible to monitor the separation between one vehicle and the next, and alert the driver when the separation drops below a desired value. In more advanced systems, it is possible to arrange for the vehicle to take remedial action, such as braking, automatically. A further possibility is to provide assistance to the driver in conditions of poor visibility due to adverse weather or low light levels, e.g. in fog or at night. It is also desirable to assist the driver to maneuver the vehicle without incident by using cameras to augment the driver's vision in areas where it is difficult for the driver to see, e.g. immediately around the vehicle below the level of the windows, especially to the sides or rear of the vehicle.

All such systems rely on some type of imaging device, for example a camera, to view or monitor the vehicle's surroundings, be it the road itself, other vehicles, etc. It is self-evident that the functioning of such systems will be adversely affected if the image formed by the device is impaired in some way. Accordingly, one prerequisite is for the imaging device to have a clear view, free of condensation, frost, ice, moisture or snow on the window, regardless of weather conditions.

Patent publication of EP 1,605,729 A2 teaches a double-paned window that may be used in a vehicle such as a car. The document further describes the use of an imaging device. To prevent the imaging device from being obstructed by ice or moisture window, a conducting heating element is laminated between the two panes of the window. The conducting element disclosed comprises thin tungsten wires which are typically 15-50 μm thick and arranged 1.8-3.0 mm apart. The tungsten wires can be arranged along a path which may be crimped. However crimped wires or wires with a meander form have been found to glare, i.e. to provide multiple points of unwanted reflections that interfere with the imaging device especially during sunny weather. Hence these forms provide drawbacks for sensitive imaging devices. This problem becomes readily apparent when such imaging devices are arranged to feed digital signals to processing units such as computers, which are to read and analyze the captured image(s).

The described wires may further be arranged in a boustrophedon pattern, i.e. straight, parallel lines connected to one another and extending in alternating directions. However for sensitive imaging devices and the connected analysis devices, these kinds of patterns can cause interference with the readings of the imaging device and the interpretation of the captured image(s), for instance when imaging specific parameters such as the center line of the road or the horizon. It therefore remains to provide a solution which provides both a reduced tendency to glare and which minimizes the risk of interference with sensitive imaging devices and related analyzing equipment.

SUMMARY

A window according to the present invention comprises a first and a second side, equivalent with an interior and an exterior side after assembly with a vehicle. The window is intended to be fitted with an imaging device which views an object exterior to the vehicle through a viewing area of the window. The viewing area of the window comprises a first and a second lateral edge, and an upper and a lower edge. The window further comprises a resistance heating element comprising at least one electrically conductive wire extending across the viewing area a plurality of times along an arc-shaped path. The present invention provides for a window with a heated viewing area to remove moisture or ice and so provide a clear view for the imaging device. The window further provides a resistance heating element which reduces the risk of unwanted interaction with the imaging device and/or the connected analyzing equipment such as a processing unit, e.g. a computer.

The arc-shaped paths can comprise a form with a radius between 20-200 mm, preferably 30-150 mm, even more preferably 30-125 mm, most preferred 35-100 mm. These dimensions have been found to minimize the likelihood of the heating wire appearing to the imaging device as a straight horizontal or vertical line, thus avoiding misinterpretation by the processing unit as a part of the environment outside of the vehicle. These dimensions also provide a minimum of glare points which can disturb the reading of the imaging or any subsequent analysis thereof. It has further been found that an advantageous pattern to both heat the window and to fulfill the above mentioned advantages can be achieved if at least 2 of the radii are different with respect to each other. The electrically heated window according to the present invention can further be distinguished by that the arc-shaped path comprises a subsequently equal or increasing radius towards the lower edge of the viewing area. For viewing areas which exhibit a pyramidal, cone or funnel like shape, this configuration has been found to be advantageous.

In a more specific embodiment of the present invention, a first arc-shaped path closest to the upper edge of the viewing area has a first radius R1, and a subsequent second arc-shaped path has a second radius R2, with R1 and R2 being substantially equal. The subsequent following arc-shaped paths are a third arc-shaped path having a third radius R3 greater than R2, a forth arc-shaped path having a forth radius R4 greater than R3, a fifth arc-shaped path with a fifth radius R5, and a sixth arc-shaped path with a sixth radius R6. In one embodiment of the present invention the wire crosses the viewing area between 4-20 times. Although 4-10 times has been found to be preferred.

The wire is preferably arranged on the first side of the window. After the window has been assembled with a vehicle, the first side corresponds to the interior side of the window. In practice the first side is usually the concave side of the window and the second side is usually the convex and exterior side of the window after assembly.

To provide an absolute minimum of interference from the wire, the arc-shaped paths preferably extend beyond the first and second lateral edge of the viewing area. In this embodiment, no vertical lines of wire are arranged within the viewing area where they are likely to be detected by the imaging device. The viewing area may comprise a virtual vertical center line wherein the arc-shaped paths are arranged symmetrically with respect the vertical center line.

BRIEF DESCRIPTION OF THE DRAWINGS

The present invention will be described in greater detail with reference to the accompanying figures, wherein.

DETAILED DESCRIPTION

Figure 1:
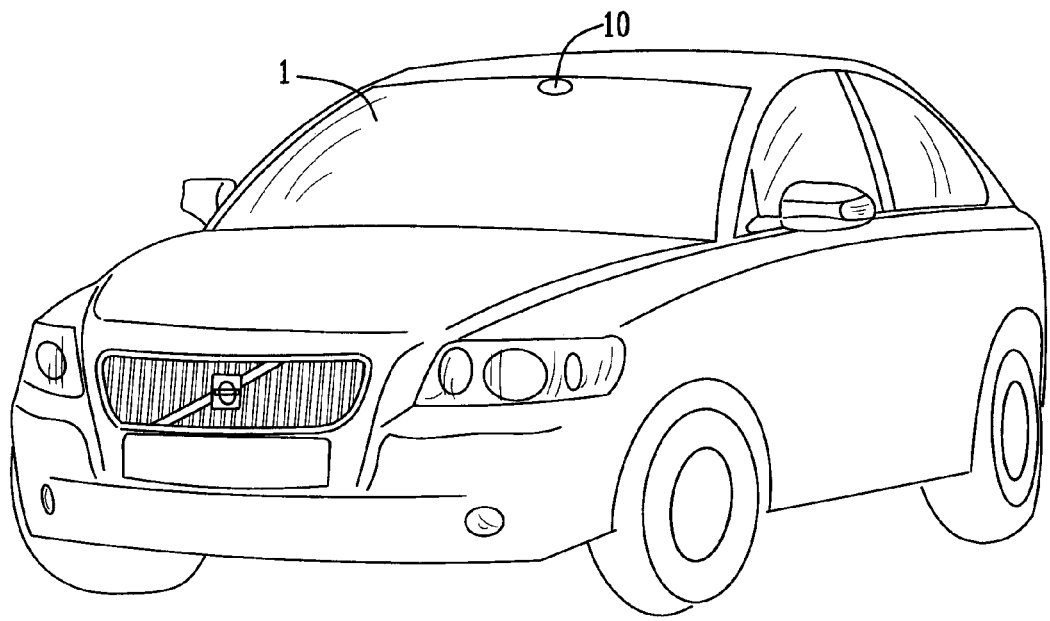
FIG. 1 shows a schematic overview of an electrically heated window assembly used in a vehicle.

FIG. 1 shows an electrically heated window 1 assembled in a vehicle. An imaging device 10 is arranged behind the window 1 and adjacent to the inner ceiling of the vehicle.

Imaging device 10 is an electro-optical device that detects radiation is a particular portion of the electromagnetic (EM) spectrum. Imaging device 10 may operate in the visible light spectrum, in the near- or far-infrared spectrum, or in any desired portion of the EM spectrum that is found to be useful in detection of objects exterior to the vehicle. Examples of such devices are a CCD (charge coupled device) or a CMOS (complementary metal oxide semiconductor) image sensor camera.

Figure 2:
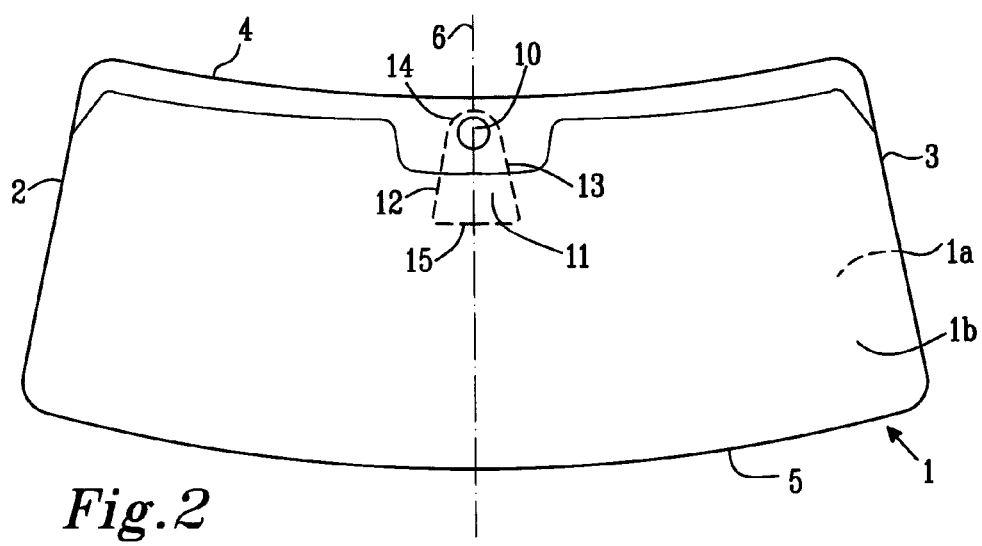
FIG. 2 shows a schematic overview of an electrically heated window assembly.

FIG. 2 shows a schematic view of the electrically heated window 1 (hereafter referred to as the window) intended to be fitted with the imaging device 10. The shown window 1 is more specifically a front windshield for a vehicle. The imaging device 10 may be connected to a processing unit such as a computer (not shown). During use, the imaging device captures images of the environment by receiving EM radiation passing through the window, and converts the images to electrical and/or digital signals representing or characterizing the image. The processing unit thereafter receives, analyses, and interprets the signals to identify images and features of the environment. For instance, the processing unit may identify the center line of the road, relate the position of the center line with the position of the vehicle and, dependent upon the result of the analysis, initiate an action. Such an action can be a voice alert telling the driver to steer the vehicle in a particular direction, activation of the headlights or other lights to alert other drivers, direct intervention in the steering of the vehicle, or the like.

As shown in FIG. 2, the window assembly comprises a window pane 1 having an interior and an exterior side 1a, 1b, a first and a second lateral edge 2, 3 and an upper and a lower edge 4, 5. When the window 1 is mounted on a vehicle, the interior side 1a of the pane is intended to be facing towards the interior of the vehicle while the exterior side 1b is intended to face the exterior of the vehicle. The imaging device 10 is arranged on the interior side 1a of the window 1 and may be in close proximity to the upper edge 4 so as to provide a large field of view. The imaging device 10 is arranged directly behind a viewing area 11, indicated in dashed lines in FIG. 2. The viewing area 11 is the area through which EM radiation passes before being received by the imaging device, i.e. the area of the window through which the imaging device "sees" an object. For purposes of description, viewing area 11 comprises a first and a second lateral edge 12, 13 and an upper and a lower edge 14, 15.

The terms upper and lower are relative terms and should be related to a vehicle positioned on its wheels (if present) in a normal operational fashion. In this sense the upper edge 13 of the viewing area 11 is intended to be closer to the roof of the vehicle while the lower edge 14 of the viewing area 11 is intended to be closer to the ground.

In the embodiment depicted herein, window 1 is substantially symmetric about a center line 6 which extends vertically between the upper and lower edges 14, 15 of the window 1. As mentioned, the imaging device 10 is arranged on the interior side 1a of the window 1 in close proximity to the upper edge 4. It is further arranged so that the center line 6 crosses the center of the viewing area 11 in a vertical manner between the upper and lower edge 14, 15 of the viewing area 11.

Figure 3:
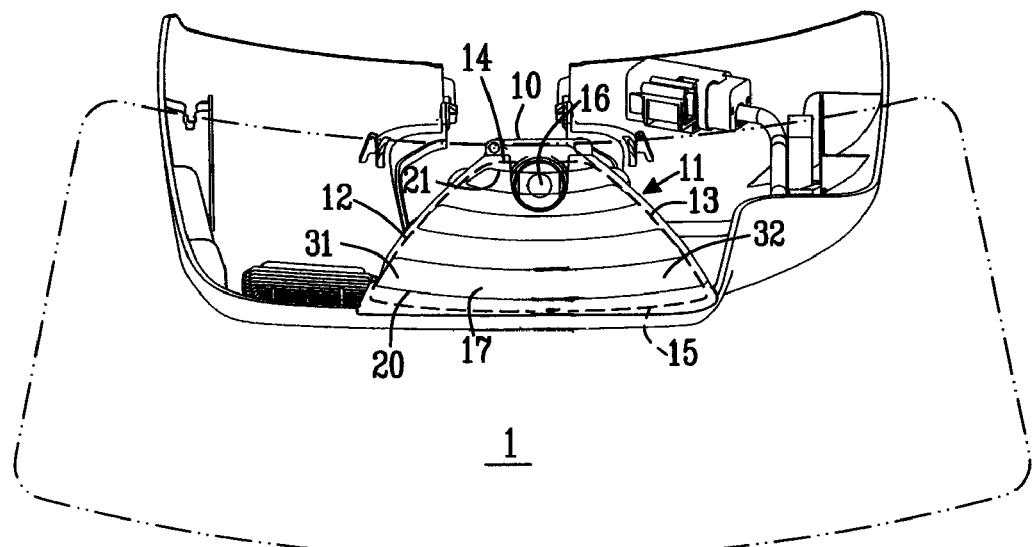
FIG. 3 shows parts of a window assembly as viewed from in front of the imaging device.

FIG. 3 shows a portion of window 1, an imaging device 10 and a resistance heating element 20, as viewed from in front of and looking into the imaging device 10. Window 1 is shown in hidden lines for clarity. The imaging device 10 is equipped with a lens 16. A glare shield 17 is arranged in a tray-like configuration relative to the lens 16 to prevent unwanted light reflections from entering the lens. The viewing area 11 is illustrated as a dashed line which, in this embodiment of the invention, substantially corresponds to the outline of the glare shield 17. A resistance heating element 20, which may be a silver and/or copper based electrically conductive wire 21, extends across the viewing area 11 along a series of interconnected, sequential, arc-shaped paths that extend laterally across viewing area 11.

The arc-shaped paths described by resistance heating element 20 minimize the number and/or severity of possible glare points along the resistance heating element 20, while still providing a form or shape that minimizes the risk of the imaging device and its connected processing device(s) misinterpreting the resistance heating element as being a part of the scene exterior to the vehicle and requiring analysis.

In general, the image processing software used in conjunction with artificial vision systems for motor vehicles is able to identify certain features of the environment (such as other vehicles, centerlines or edges of roadways, guard rails, etc.) by detecting certain combinations of horizontal and vertical lines. The arc-shaped paths followed by wire 21, when viewed from the perspective of imaging device 10, presents a minimum amount of horizontal and vertical lines that may be misinterpreted by the image processing software as part of the environment exterior to the vehicle.

Figure 4:
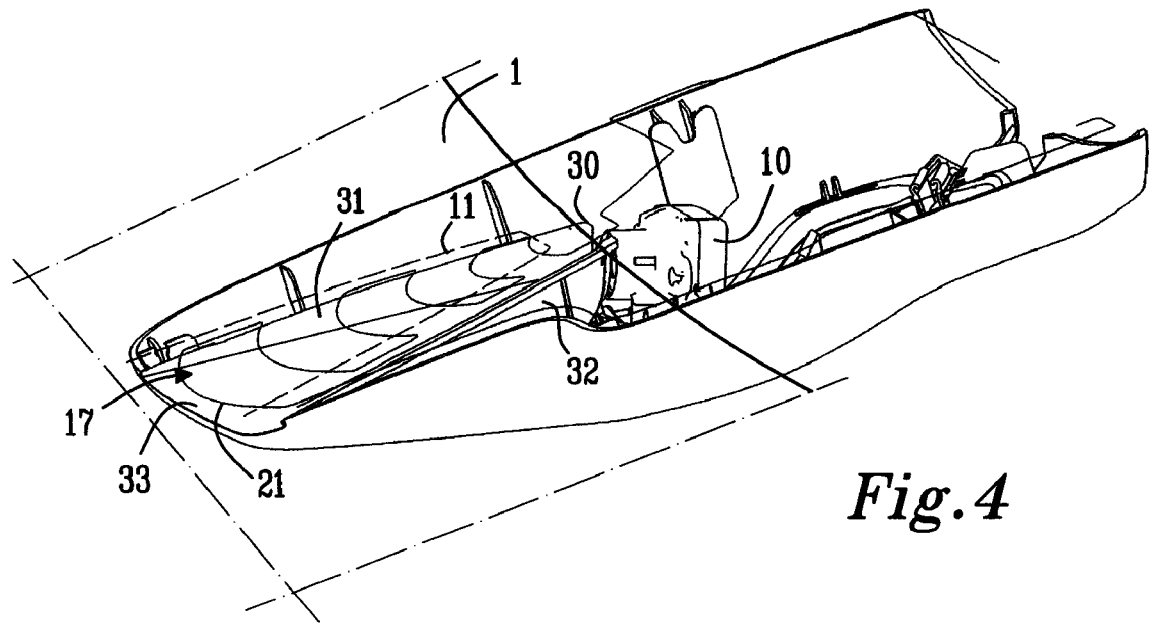
FIG. 4 is a perspective view of the apparatus shown in FIG. 3.

Referring now to FIG. 4, viewing area 11 is shown in dotted lines and is for clarity illustrated slightly displaced with respect to the wire 21. The glare shield 17 comprises a bottom 33 and first and second side walls 31, 32 extending along opposite edges of the bottom. An opening 30 is located at the upper end of glare shield 17 where the imaging device 10 is arranged. The described configuration permits the glare shield 17 to be attached to the interior side of the window, preferably so that the imaging device is arranged with an angle between 2-10° more preferably between 2-6°, with respect to a horizontal plane. The glare shield 17 prevents unwanted reflections in the EM spectrum detected by the imaging device 10 from entering the imaging device, and enables a quick and easy assembly of the imaging device with the window and the vehicle.

In one embodiment of the present invention the glare shield 17 substantially defines the viewing area 11, as is advantageous because unwanted reflection is reduced to a minimum.

Figure 5:
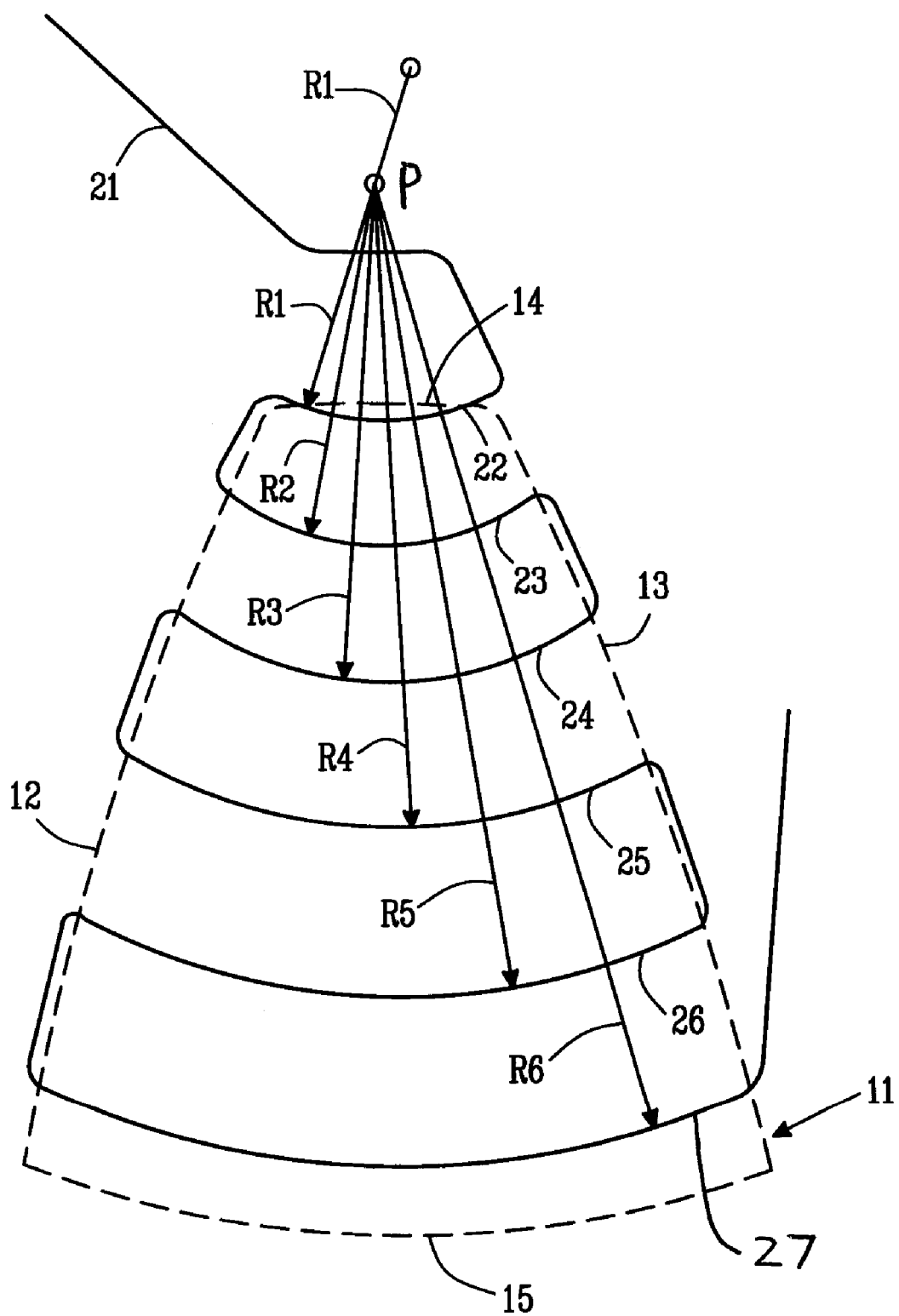
FIG. 5 shows a pattern of wire of a window according to one embodiment of the present invention.

FIG. 5 shows an embodiment in which the path followed by wire 21 starts at the viewing area upper edge 14 and extends along a first arc-shaped path 22 crossing the viewing area and having a radius R1. The first arc-shaped path 22 connects with a segment that runs substantially parallel with viewing area lateral edge 12, and thereafter returns back across the viewing area 11 along a second arc-shaped path 23 with a radius R2, and so forth. The third arc-shaped path 24 has a radius R3, the fourth arc-shaped path 25 has a radius R4, the fifth arc-shaped path 26 has a radius R5, and the sixth arc-shaped path 27 has a radius R6. Generally the radius R2, which defines the second arc-shaped path close to the upper edge 14 of the viewing area 11, is less than the subsequent radius R3 of the subsequent arc-shaped path 24. But as is shown in FIG. 5, the first radius R1 is substantially equal to the second radius R2. Hence in a preferred embodiment of the present invention the relationship between the radii are R1=R2<R3<R4<R4<R5<R6. Table 1 gives values for the radii of the arc-shaped paths for one possible embodiment of the invention.

| No. of arc-shaped paths (reference no. from FIG. 4 within brackets) | Radius of arc (mm) |
| --- | --- |
| 1 (22) | R1 = 34 |
| 2 (23) | R2 = 34 |
| 3 (24) | R3 = 50 |
| 4 (25) | R4 = 67 |
| 5 (26) | R5 = 98 |
| 6 (27) | R6 = 121 |

Arc-shaped paths 22-27 may extend beyond viewing area lateral edges 12, 13 so that the straight segments of wire parallel with the lateral edges are outside of viewing area 11. This ensures that the straight segments are outside of the field of view of imaging device 10.

In FIG. 5, the arc-shaped paths 23-27 are shown as having a common center-of-curvature located at a point P adjacent viewing area upper edge 14. The center-of-curvature for path 22 may be located at a point above point P as shown. In an alternative embodiment (not shown), the center-of-curvature of the arc-shaped paths can be adjacent the viewing area lower edge 15, and the radii of the paths increasing as they progress upwardly across the viewing area 11. It is further within the boundaries of the present invention that the center-of-curvature P be adjacent either of the lateral edges 12, 13 of the viewing area. Combinations of the above and mixtures of the above are also possible, e.g. a spiral pattern is a combination of arc-shaped paths. That part of the wire which ends in the center of the spiral pattern is thereafter preferably directed along an arc-shaped path out from the spiral pattern and is isolated from the remaining wire to prevent short circuiting of the system. It remains important however that no vertical or horizontal straight lines are present as such have been found to interfere with the imaging device and analyze of the captured data (e.g. pictures).

The resistance heating element 20, and specifically the wire 21, may be made of silver and/or copper based material with a thickness of about 0.1-0.5 mm, preferably between 0.2-0.4 mm.

The resistance heating element 20 may be connected to the vehicle electrical system when assembled with a vehicle, in a conventionally-known manner.

While the best mode for carrying out the invention has been described in detail, those familiar with the art to which this invention relates will recognize various alternative designs and embodiments for practicing the invention as defined by the following claims.

What is claimed:

1. An electrically heated window assembly comprising:
   a window having a first side, a second side, and a viewing area for allowing an imaging device disposed adjacent the first side of the window to detect objects therethrough, the viewing area having a first and a second lateral edge and an upper and a lower edge; and
   a resistance heating element comprising at least one electrically conductive wire disposed on the window within the viewing area and following a plurality of sequential arc-shaped paths, at least two of the arc-shaped paths being of radii unequal to one another.

2. The apparatus according to claim 1, wherein each of the plurality of arc-shaped paths is of a radius between 20 and 200 millimeters.

3. The apparatus according to claim 1, wherein the plurality of arc-shaped paths are of increasing radii towards the lower edge of the viewing area.

4. The apparatus according to claim 3, wherein a first arc-shaped path of the plurality closest to the upper edge of the viewing area is of a first radius, a second arc-shaped path of the plurality is of a second radius substantially equal to the first radius, a third arc-shaped path is of a third radius greater than the second radius, and a forth arc-shaped path is of a forth radius greater than the third radius.

5. The apparatus according to claim 1, wherein the wire crosses the viewing area between 4 and 20 times.

6. The apparatus according to claims 1 wherein at least two of the arc-shaped paths have a common center-of-curvature at a point adjacent the upper edge of the viewing area.

7. The apparatus according to claim 1, wherein the wire is disposed on the first side of the window.

8. The apparatus according to claim 1, wherein at least one of the plurality of arc-shaped paths extends beyond the first and second lateral edges of the viewing area.

9. The apparatus according to claim 1, wherein the viewing area has a virtual vertical centerline and the plurality of arc-shaped paths are arranged symmetrically with respect the vertical centerline.

10. The apparatus according to claim 1, wherein the wire is from 0.1 millimeters to 0.5 millimeters thick within the viewing area.

\* \* \* \* \*